United States Patent [19]

McCarty

[11] Patent Number: 5,779,178
[45] Date of Patent: Jul. 14, 1998

[54] SEAT BELT RETRACTOR ASSEMBLY HAVING MAGNETICALLY ACTUATED LOCKING MECHANISM

[75] Inventor: Bryan R. McCarty, Laurinburg, N.C.

[73] Assignee: Rostra Precision Controls, Inc., Laurinburg, N.C.

[21] Appl. No.: 746,311

[22] Filed: Nov. 7, 1996

[51] Int. Cl.$^6$ ................................................ B60R 21/00
[52] U.S. Cl. .................................... 242/384; 280/806
[58] Field of Search .............................. 242/383.1, 384, 242/384.4; 280/805, 806, 807

[56] References Cited

U.S. PATENT DOCUMENTS

| | | | |
|---|---|---|---|
| 4,008,864 | 2/1977 | Torphammar et al. | 242/384 |
| 4,895,317 | 1/1990 | Rumpf et al. | 242/384 |
| 5,224,736 | 7/1993 | Sedlmayr et al. | 280/807 |
| 5,538,098 | 7/1996 | Sparhawk | 280/806 |

FOREIGN PATENT DOCUMENTS

| | | | |
|---|---|---|---|
| 38 04 032 A1 | 8/1989 | Germany | 280/806 |
| 40 02 845 C1 | 6/1991 | Germany | 280/806 |
| 52-1824 | 1/1977 | Japan | 242/383.1 |
| 1 269 792 | 4/1972 | United Kingdom | 242/384 |

*Primary Examiner*—John P. Darling
*Attorney, Agent, or Firm*—MacMillan, Sobanski & Todd

[57] ABSTRACT

A retractor assembly for a seat belt system includes a magnetically actuated locking mechanism to selectively prevent extension of the seat belt. The retractor assembly includes a spring loaded spindle about which the seat belt may be wrapped and selectively extended. A ratchet wheel having a plurality of ratchet teeth is secured to the spindle for rotational movement therewith to control the rotation of the spindle and, thus, the extension of the belt from the retractor assembly. A locking mechanism is provided for controlling the rotation of the ratchet wheel for this purpose. The locking mechanism includes a pawl which is selectively movable between an engaged position, wherein rotation of the ratchet wheel in the extension direction is prevented, and a disengaged position, wherein rotation of the ratchet wheel in the belt extension direction is permitted. The locking mechanism further includes a magnetic actuator for controlling the movement of the pawl between the engaged and disengaged positions. The magnetic actuator includes a permanent magnet provided on the pawl for movement therewith. The magnetic actuator also includes a pole piece formed from a magnetically permeable material having a pole piece magnet disposed thereabout. As a result, the pole piece normally assumes a first predetermined magnetic polarization orientation which repels the pawl magnet, causing the pawl to be moved to the engaged position. An electromagnetic coil is disposed about the pole piece for selectively moving the pawl from the engaged position to the disengaged position against the urging of the pole piece magnet. When energized, the coil causes the pole piece to assumes a second predetermined magnetic polarization orientation which attracts the pawl magnet, causing the pawl to be moved to the disengaged position.

1 Claim, 3 Drawing Sheets

SEAT BELT RETRACTOR ASSEMBLY HAVING MAGNETICALLY ACTUATED LOCKING MECHANISM

BACKGROUND OF THE INVENTION

This invention relates in general to retractable seat belt systems for selectively restraining movement of occupants within a vehicle. More specifically, this invention relates to an improved structure for a retractor- assembly for use in such a seat belt system which includes a locking mechanism to selectively prevent extension of the seat belt, wherein the locking mechanism is operated by a magnetic actuator.

Retractable seat belt systems are standard items in virtually all vehicles currently being manufactured. A typical seat belt system includes a belt having a buckle provided thereon which cooperates with a conventional receptacle latch to restrain an occupant from undue movement in the event of a sudden change in inertia resulting from rapid deceleration or other movement of the vehicle. One end of the belt is secured to a retractor assembly which, in turn, is secured to a fixed portion of the vehicle. The retractor assembly is provided for paying out the belt when desired for use and for retracting the belt when not in use. The other end of the belt is secured directly to a fixed potion of the vehicle.

Most known retractable seat belt systems are equipped with a locking mechanism for selectively preventing the belt from being extended from the retractor assembly under certain conditions, such as a sudden change in inertia as a result of rapid deceleration of the vehicle or a rapid withdrawal of the belt from the spindle. A number of locking mechanisms are known in the ail for accomplishing this function. For example, it is known to provide the retractor assembly with a ratchet and pawl arrangement, wherein the ratchet is secured to the spindle for rotation therewith and the pawl is selectively moved into and out of engagement with the ratchet to prevent extension of the belt under those certain conditions.

SUMMARY OF THE INVENTION

This invention relates to an improved structure for a retractor assembly for use in such a seat belt system which includes a locking mechanism to selectively prevent extension of the seat belt, wherein the locking mechanism is operated by a magnetic actuator. The retractor assembly includes a spring loaded spindle about which the seat belt may be wrapped and selectively extended. A ratchet wheel having a plurality of ratchet teeth is secured to the spindle for rotational movement therewith to control the rotation of the spindle and, thus, the extension of the belt from the retractor assembly. A locking mechanism is provided for controlling the rotation of the ratchet wheel for this purpose. The locking mechanism includes a pawl which is selectively movable between an engaged position, wherein rotation of the ratchet wheel in the extension direction is prevented, and a disengaged position, wherein rotation of the ratchet wheel in the belt extension direction is permitted. The locking mechanism further includes a magnetic actuator for controlling the movement of the pawl between the engaged and disengaged positions. The magnetic actuator includes a permanent magnet provided on the pawl for movement therewith. The magnetic actuator also includes a pole piece formed from a magnetically permeable material having a pole piece magnet disposed thereabout. As a result, the pole piece normally assumes a first predetermined magnetic polarization orientation which repels the pawl magnet, causing the pawl to be moved to the engaged position. An electromagnetic coil is disposed about the pole piece for selectively moving the pawl firom the engaged position to the disengaged position against the urging of the pole piece magnet. When energized, the coil causes the pole piece to assumes a second predetermined magnetic polarization orientation which attracts the pawl magnet, causing the pawl to be moved to the disengaged position.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
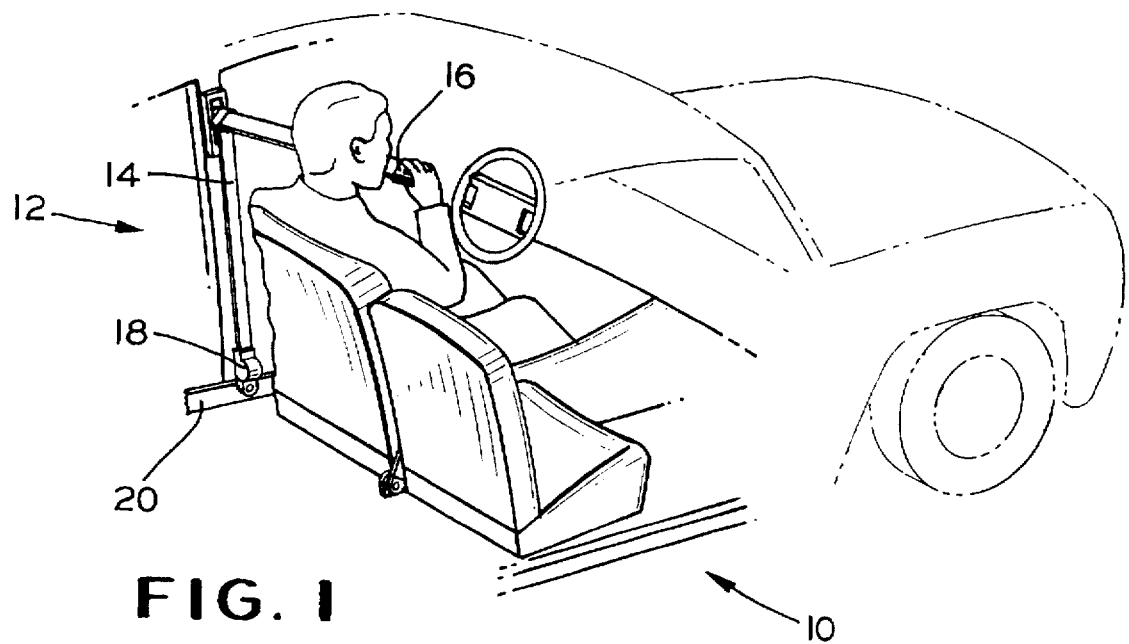
FIG. 1 is a perspective view of a portion of a vehicle including a retractable seat belt assembly in accordance with this invention.

Referring now to the drawings, there is illustrated in FIG. 1 a portion of a conventional vehicle 10 including a retractable seat belt assembly, indicated generally at 12, in accordance with this invention. The retractable seat belt assembly 12 includes a belt 14 having a buckle 16 provided thereon which cooperates with a conventional receptacle latch (not shown) in a well known manner to restrain an occupant from undue movement in the event of a sudden change in inertia as a result of a rapid deceleration of the vehicle 10 or other undesirable operating condition. One end of the belt 14 is secured to a retractor assembly 18 which, in turn, is secured to a fixed portion of the vehicle 10, such as a frame 20 or seat back of the vehicle 10. The retractor assembly 18 is provided for paying out the belt 12 when desired for use and for retracting the belt 12 when not in use. The other end of the belt 14 is secured directly to a fixed portion of the vehicle.

Figure 2:
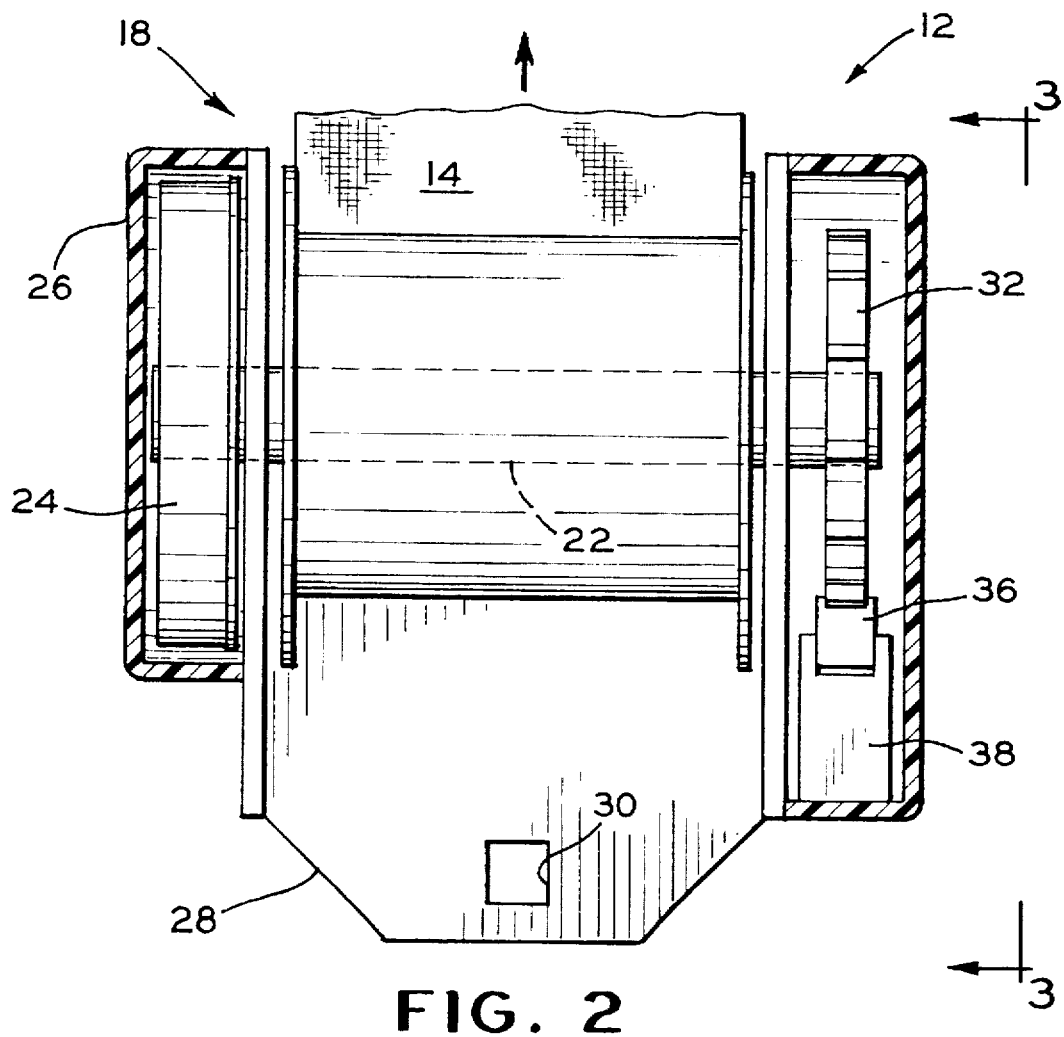
FIG. 2 is an elevational view, partially in cross-section, of a retractor assembly for the retractable seat belt assembly illustrated in FIG. 1.

As shown in FIG. 2, the retractor assembly 18 includes a cylindrical spindle 22 about which the belt 14 may be wrapped. A spring 24 is provided in a housing 26 for urging the spindle 22 to rotate in a first direction (a retraction direction indicated at 64 in FIGS. 3 and 4) so as to wind the belt 14 thereupon. However, when the belt 14 is pulled by an occupant of the vehicle 10 in the direction indicated by the arrow in FIG. 2, the spindle 22 is rotated in a second direction (an extension direction indicated at 62 in FIGS. 3 and 4) to pay out or extend the belt 14 from the spindle 22 against the urging of the spring 24. The retractor assembly 18 can be provided with any suitable means for attachment to a fixed potion of the vehicle, such as a mounting plate 28 having a bolt hole 30 formed therethrough.

A ratchet member, such as a ratchet wheel 32, is secured to the spindle 22 for rotational movement therewith. The rotation of the ratchet wheel 32 is controlled to control the rotation of the spindle 22 and, thus, the extension of the belt 14 from the retractor assembly. A locking mechanism, indicated generally it 34, is provided for controlling the rotation of the ratchet wheel 32 for this purpose. The locking mechanism 34 includes a pawl 36 which is selectively movable between an engaged position illustrated in FIG. 3 and a disengaged position illustrated in FIG. 4. As will be explained in greater detail below, when the pawl 36 is in the engaged position, rotation of the ratchet wheel 32 in the extension direction 62 is prevented. As a result, the belt 14 cannot be extended further from the retractor assembly 18. When the pawl 36 is in the disengaged position, rotation of the ratchet wheel 32 in the belt extension direction 62 is permitted, and the belt 14 can be extended further from the retractor assembly 18. The locking mechanism 34 further includes a magnetic actuator, indicated generally at 38, for controlling the movement of the pawl 36 between the engaged and disengaged positions. The structure and operation of the magnetic actuator 38 will be described in detail below.

Figure 3:
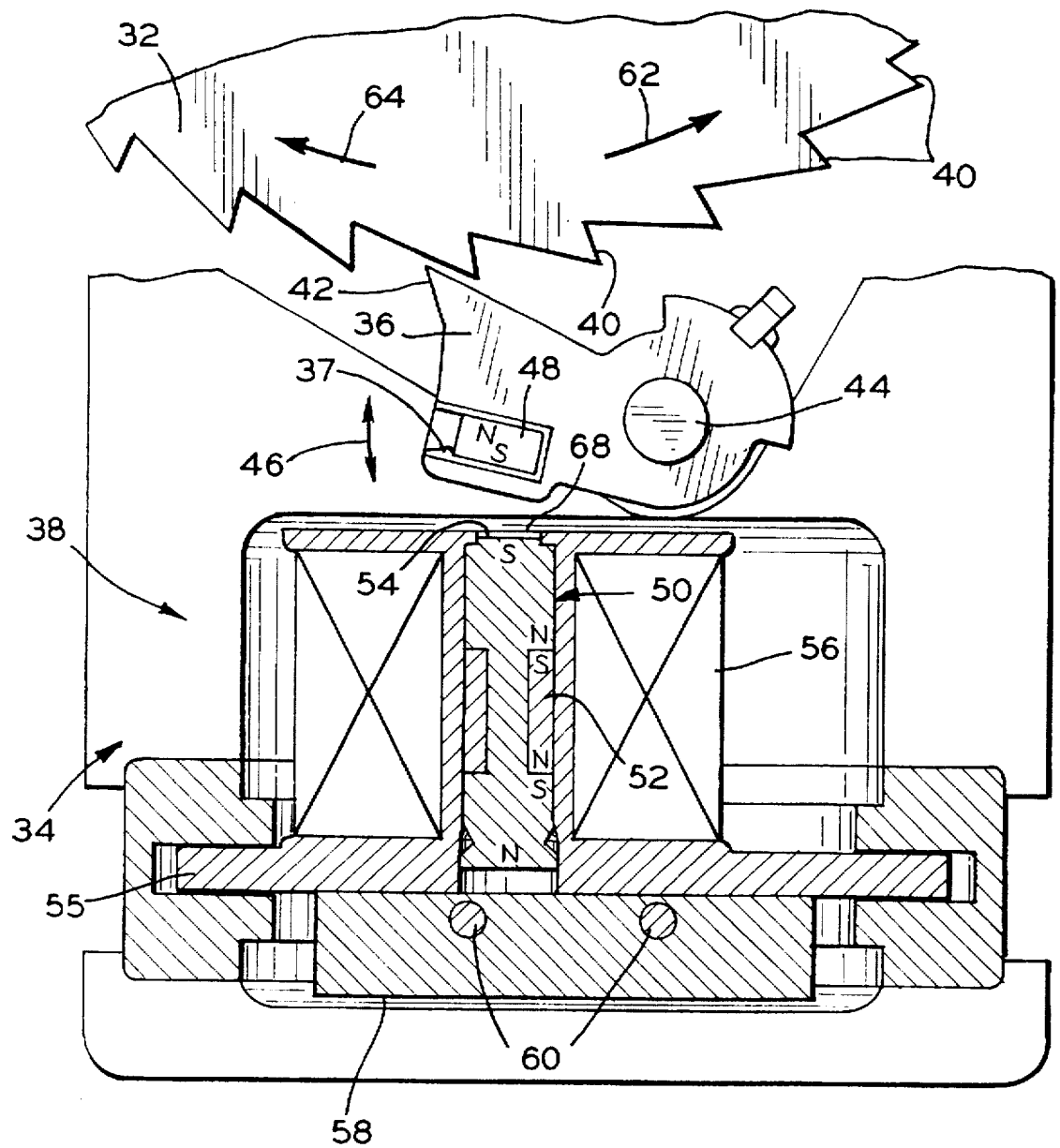
FIG. 3 is a sectional elevational view taken along line 3—3 of FIG. 2 showing the pawl of the retractor assembly in an engaged position relative to a ratchet wheel.
Figure 4:
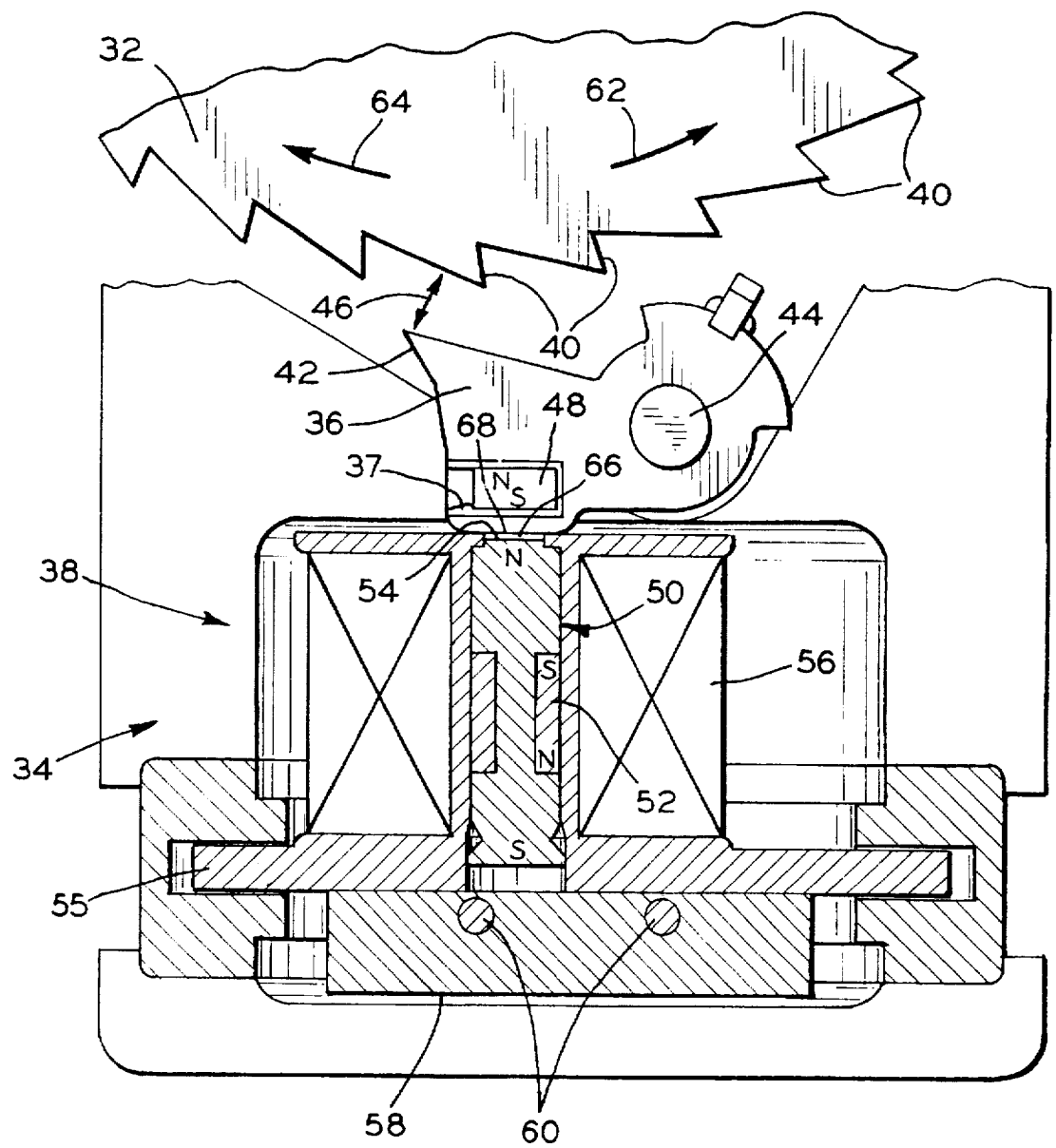
FIG. 4 is a sectional elevational view similar to FIG. 3 showing the pawl of the retractor assembly in a disengaged position relative to the ratchet wheel.

As best shown in FIGS. 3 and 4, the ratchet wheel 32 is foamed having a plurality of ramp-shaped teeth 40. Similarly, the pawl 36 is foamed having a ratchet-engaging end 42 which can be moved into engagement the ratchet wheel teeth 40 so as to prevent the ratchet wheel 32 from rotating in the belt extension direction 62. The number and shapes of ratchet wheel teeth 32 can vary, as can the shape of the ratchet-engaging end 42 of the pawl 36, so as to be suitable for engagement with one another. The pawl 36 is mounted on a pivot pin 44 for pivoting motion between the engaged and disengaged positions, as indicated by arrow 46 in FIGS. 3 and 4.

A magnetic device, preferably a permanent magnet 48, is provided on the pawl 36 for effecting movement of the pawl 36 between the engaged and disengaged positions. Preferably, the pawl 36 is formed having a magnet retainer cavity 37 for receiving and retaining the pawl magnet 48 therein. The illustrated magnet retainer cavity 37 is designed to facilitate easy assembly of the permanent magnet 38 therein, and can be of any suitable shape for that purpose. However, the pawl magnet 48 can be mounted on or secured to the pawl 36 in any other known manner, such as by ultrasonic welding, heat staking, overmolding, or press fitting. The pawl magnet 48 has opposed pole faces which exhibit opposite magnetic polarizations, namely, north and south (N and S, as shown in the drawings). In the illustrated embodiment, the first pole face of the pawl magnet 48 (which faces away from the imagnetic actuator 38) has a north magnetic polarization, while the second pole face of the pawl magnet 48 (which faces toward the magnetic actuator 38) has a South magnetic polarization.

As mentioned above, the magnetic actuator 38 is provided for controlling the movement of the pawl 36 between the engaged and disengaged positions. The magnetic actuator 38 includes a pole piece 50 which, in the illustrated embodiment, is generally cylindrical in shape. The pole piece 50 is formed from a magnetically permeable material, such as carbon steel. The magnetic actuator 38 further includes a pole piece magnet 52 which, in the illustrated embodiment, is a permanent magnet which is hollow and cylindrical in shape. As shown in FIGS. 3, and 4, the pole piece 50 is formed having a reduced diameter central portion defining an annular recess, and the pole piece magnet 52 is disposed within that recess. The outer diameter of the combined pole piece 50 and pole piece magnet 52 assembly is essentially uniform, although such is not required.

The pole piece magnet 52 has opposed pole faces which exhibit respective magnetic polarizations, namely, north and south (N and S, as shown in the drawings). In the illustrated embodiment, the first pole face of the pole piece magnet 52 (which faces toward the pawl 36) has a south magnetic polarization, while the second pole face of the pole piece magnet 52 (which faces away from the pawl 36) has a north magnetic polarization. The magnetic field produced by the pole piece magnet 52 creates magnetic flux (lines of force) which flow through the pole piece 50. As a result, a first pole face 54 of the pole piece 50 (located adjacent to the pawl 36) assumes a south magnetic polarization, while a second pole face of the pole piece 50 (located opposite the first pole face 54) assumes a north magnetic polarization.

Thus, absent any other factors, the adjacent pole faces of the pawl magnet 48 and the pole piece 50 have the same magnetic polarization, both being south magnetic polarizations in the illustrated embodiment. The pole piece 50 is fixed in position relative to the other components of the locking mechanism 34 of the retractor assembly 18, as described further below. As a result, the pawl 36 carrying the pawl magnet 48 is repelled by the pole piece 50 so as to be pivoted about the pivot pin 44 to the engaged position illustrated in FIG. 3. As discussed above, the ratchet-engaging end 42 of the pawl 36 is moved into engagement the teeth 40 of the ratchet wheel 32 when the pawl 36 is in this engaged position.

The magnetic actuator 38 also includes means for selectively moving the pawl 36 out of the engaged position to the disengaged position illustrated in FIG. 4 against the urging of the pole piece magnet 52. In the illustrated embodiment, this means for selectively moving includes a bobbin 55 which is positioned concentrically about the pole piece 50. A coil 56 of an electrically conductive wire, such as copper wire, is wound about the bobbin 55 such that it also concentrically surrounds the pole piece 50. The bobbin 55 is preferably foamed formed an electrically non-conductive and non-magnetically permeable material, such as plastic, and can be mounted in a predetermined fixed position on a base, such as a bobbin terminal area 58. Electrical lead wires 60 are provided to selectively supply electrical current to the coil 56 from a control circuit (not shown) including a source of electrical energy.

When it is desired to move the pawl 36 from the normally engaged position illustrated in FIG. 3 to the disengaged position illustrated in FIG. 4, an electrical current is passed through coil 56 by the control circuit. In response to the flow of electrical current through the coil 56, a electromagnetic field is generated thereby, as is well known. The magnetic flux of this electromagnetic field flows through the pole piece 50, generating opposite magnetic polarizations at the opposed pole faces thereof. The orientation of these magnetic polarizations is dependent upon the direction of flow of electrical current through the coil 56. In this instance, the electrical current is caused to flow through the coil 56 in such a direction, and further in such a magnitude, as to cause the pole face 54 to assume a north magnetic polarization, notwithstanding the presence of the pole piece magnet 52 and its above-described effects on the pole piece 50. When this occurs, the north magnetic polarization of the pole face 54 of the pole piece 50 attracts the pawl magnet 48 which, as discussed above, has the adjacent pole face of a south magnetic polarization. As a result, the pawl 36 is pivoted from the engaged position illustrated in FIG. 3 to the disengaged position illustrated in FIG. 4.

During normal operation of the vehicle 10, the coil 56 is energized by an electrical current of sufficient magnitude from the control circuit as to overcome the effect of the pole piece magnet 52 and cause the pole face 54 of the pole piece 50 to assume a north magnetic polarization. Consequently, the pawl 36 is normally maintained in the disengaged position illustrated in FIG. 4. As a result the ratchet-engaging end 42 of the pawl 36 is normally positioned out of engagement with the teeth 40 of the ratchet wheel 32, allowing free rotational movement thereof to accommodate normal extension and retraction of the belt 14 to and from the spindle 22. In the event of a sudden change of inertia as a result of a rapid deceleration of the vehicle or other sensed condition, however, the control circuit will disconnect the coil 56 from the source of electrical energy, thereby disrupting the flow of electrical current through the coil 56. The disruption of this electrical current flow may be triggered by the sensation of one or more conditions by the control circuit, such as a sudden change of inertia or rapid deceleration of the vehicle 10, a rapid extension of the belt 14 from the retractor 18, or any other desired condition. Sensors for determining the existence of such conditions and the circuit structure for disrupting the flow of electrical current in response thereto, are well known in the art.

As a result, the electromagnetic field generated by the coil 56 dissipates, allowing the pole piece magnet 52 to re-establish the south magnetic polarization at the pole face 54 of the pole piece 50. When this occurs, the pawl magnet 48 is repelled from the pole piece 50, causing the pawl 36 to pivot into the engaged position illustrated in FIG. 3. Thus, the ratchet-engaging end 42 of the pawl 36 is moved into engagement with the teeth 40 of the ratchet wheel 32, preventing rotational movement thereof in the extension direction 62 and, therefore, further extension of the belt 14 to and from the spindle 22.

In the above-described embodiment of the invention, the electrical current passing through the coil 56 is merely interrupted so as to allow the magnetic repulsion between the pawl magnet 48 and the pole piece 50 to move the pawl 36 from the disengaged position to the engaged position. As alternative to this structure, it may be desirable not only to interrupt the flow of electrical current passing through the coil 56, but rather to reverse the flow of electrical current passing through the coil 56 when it is desired to move the pawl 36 from the disengaged position to the engaged position. As mentioned above, the orientation of the magnetic polarization of the pole piece is dependent upon the direction of flow of electrical current through the coil 56. By reversing the direction of flow of this electrical current, the magnetic polarization of the pole face 54 is changed from a north magnetic polarization (used to maintain the pawl 36 in the disengaged position) to a south magnetic polarization. As a result, the is repulsion force which is generated between the pole piece 50 and the pawl magnet 48 is rapidly increased. Consequently, the pawl 36 will be moved from the disengaged position to the engaged position more rapidly by the combined effects of the magnetic fields generated by the pole piece magnet 52 and the coil 56 than by the sole magnetic field generated by the pole piece magnet 52 when the coil 56 is not energized.

The magnitude of repulsive or attractive force applied to the pawl magnet 48 carried by the pawl 36 is a function of, among other things, the magnetic field strengths of the pole piece magnet 52 and the pawl magnet 48, the length and diameter of the pole piece 50, the relative position of the pole piece magnet 52 along the length of the pole piece 50, the shape of the pole face 54, and the distance between the pawl magnet 48 and the pole face 54. Preferably, the pole face 54 of the pole piece 50 is stepped as shown in FIGS. 3 and 4 so as to efficiently shape the magnetic field relative to the pawl magnet 48. This stepped shape, as well as other shapes, can be used to tailor the attractive force, the repelling force, and the holding force relationships between the pole piece 50 and the pawl magnet 48 so as to influence the velocity at which the pawl 36 engages and disengages the ratchet wheel 32.

As shown in FIG. 4, when the pawl 36 is pivoted completely toward the energizable magnet 38, a relatively small air gap 66 preferably remains between the pawl 36 and the pole face 54. This gap 66 is created because the pawl 36 is physically limited in its pivoting movement toward the pole piece 50 by mechanical engagement with an outer face 68 of the bobbin 55. The gap 66 prevents physical contact between the pawl 36 and the pole face 54, thereby reducing the response time for re-engagement of the ratchet wheel 32 by the pawl 36 when the coil 56 is subsequently de-energized. The preferred response time is less than about ten milliseconds and more preferably less than about five milliseconds. In the illustrated embodiment, the gap 66 is within the range of from about 1.0 mm to about 2.0 mm, although the optimum distance will be determined by the size of the various components and other factors.

It will be noted that in the event of a power failure in the control circuit, the flow of electrical current to the coil 56 will be interrupted as if a sudden change in inertia or rapid deceleration of the vehicle 10 had occurred. Although the ratchet wheel 32 is prevented from rotating in the extension direction 62 when this occurs, it is a failure mode which is safe to the occupant of the vehicle 10. This is because the belt 14 will continue to be prevented from being extended if a sudden change in inertia or rapid deceleration of the vehicle 10 is encountered, regardless of whether electrical power is supplied to the control circuit of the retractor assembly 18. Notwithstanding this, however, the retractor assembly 18 could be modified by reversing the polarity of one of the magnets 48 or 52 such that they attract one another to normally maintain the pawl 36 in the disengaged position, and the coil 56 is energized to overcome this attraction to move the pawl 36 to the engaged position.

In summary, this invention relates to a retractor assembly for use in a vehicle seat belt assembly including a spindle for storing a seat belt wound thereupon, wherein the spindle is rotatable about axis in both a belt extension or withdrawal direction and a belt retraction direction. The retractor assembly also includes a ratchet wheel which is fixed for rotation with the spindle. A movable pawl is provided which is movable between an engaged position, for preventing rotational movement ratchet wheel and the spindle in the belt extension direction, and a disengaged or release position, for permitting rotation of the ratchet wheel and said spindle in the belt extension direction. A permanent magnet is attached to the pawl for movement therewith. Lastly, a magnetic control means is provided for controlling movement of the permanent magnet and the pawl between the disengaged and engaged positions. The magnetic control means includes a first magnetic biasing means, for biasing the permanent magnet and the pawl toward the engaged position, and a second magnetic biasing means, for biasing the permanent magnet and the pawl toward the disengaged position. The first magnetic biasing means can include a permanent magnet, such that the permanent magnet of the first magnetic biasing means and the permanent magnet attached to the pawl are first and second permanent magnets, respectively. As shown in FIGS. 3 and 4, the second permanent magnet is located relatively near to the first permanent magnet when the pawl is in the disengaged position, and is located relatively far from the first permanent magnet when the pawl is in the engaged position. The illustrated first and second permanent magnets are oriented to provide a magnetic repulsive force between them. The second magnetic biasing means can include an electromagnet. The electromagnet of the second magnetic biasing means provides an attractive force between the permanent magnet and the electromagnet when the electromagnet is energized.

The first magnetic biasing means provides a first magnetic biasing force for acting upon the permanent magnet, while the second magnetic biasing means provides a second magnetic biasing force for acting upon the permanent magnet. As discussed above, the second magnetic biasing force is greater than the first magnetic biasing force to cause the pawl to be moved from the engaged position to the disengaged position. The first magnetic biasing means can constantly provide the first magnetic biasing force, while the second magnetic biasing means can provide the second magnetic biasing force in response to at least one predetermined vehicle condition. For example, means can be provided for sensing a change in vehicle inertia greater than a predetermined amount and means for causing the second magnetic biasing means to provide the second magnetic biasing force until the change in vehicle inertia is sensed.

In accordance with the patent statutes, the principle and mode of operation of this invention have been explained and illustrated in its preferred embodiment. However, it must be understood that this invention may be practiced otherwise than as specifically explained and illustrated without departing from its scope.

What is claimed is:

1. A retractor assembly for use in a seat belt system comprising:

a spindle rotatable in a first direction to extend a seat belt therefrom and in a second direction to retract the seat belt;

a ratchet member connected for rotation with said spindle;

a pawl which is movable between an engaged position, wherein said pawl engages said ratchet member to prevent rotation is said first direction, and an engaged position, wherein said pawl does not engage said ratchet member, a first permanent magnet carried on said pawl for movement therewith and defining a first magnet pole face; and a magnetic actuator for moving said pawl between said engaged and disengaged positions, said magnetic actuator including a second hollow permanent magnet disposed about a core of a magnetically permeable material that defines a second magnet pole face, said first and second magnet pole faces having the same magnetic polarization such that said first magnet is repelled from said second magnet to normally urge said pawl toward said engaged position, said magnetic actuator further including means selectively actuable to urge said first magnet and said pawl toward said disengaged position.

* * * * *

UNITED STATES PATENT AND TRADEMARK OFFICE
CERTIFICATE OF CORRECTION

PATENT NO. : 5,779,178
DATED : July 14, 1998
INVENTOR(S) : Bryan R. McCarty

It is certified that error appears in the above-identified patent and that said Letters Patent is hereby corrected as shown below:

Column 8, Claim 1, line 9,    after "and" change "an engaged" to --a disengaged--.

Please add the following claims:

2. The retractor assembly defined in Claim 1 wherein said means for urging said first magnet and said pawl toward said disengaged position includes an electromagnet that is selectively energizable to cause said second magnet pole face to assume a magnetic polarization that is opposite the magnetic polarization of said first magnet pole face such that said first magnet is attracted toward said second magnet to urge said pawl toward said disengaged position.

UNITED STATES PATENT AND TRADEMARK OFFICE
CERTIFICATE OF CORRECTION

PATENT NO. : 5,779,178
DATED : July 14, 1998
INVENTOR(S) : Bryan R. McCarty

It is certified that error appears in the above-identified patent and that said Letters Patent is hereby corrected as shown below:

3. The retractor assembly defined in Claim 2 wherein said electromagnet is de-energized in response to a sensed operating condition.

4. The retractor assembly defined in Claim 3 wherein said sensed operating condition is a change in inertia.

5. The retractor assembly defined in Claim 3 wherein said sensed operating condition is a rapid deceleration.

Signed and Sealed this

Sixteenth Day of February, 1999

Attest:

Attesting Officer

Acting Commissioner of Patents and Trademarks